US008094139B2

(12) United States Patent
Bergström et al.

(10) Patent No.: US 8,094,139 B2
(45) Date of Patent: Jan. 10, 2012

(54) METHOD IN ELECTRONIC PEN, COMPUTER PROGRAM PRODUCT, AND ELECTRONIC PEN

(75) Inventors: Daniel Bergström, Malmö (SE); Ola Sandstrom, Malmö (SE)

(73) Assignee: Anoto AB, Lund (SE)

( * ) Notice: Subject to any disclaimer, the term of this patent is extended or adjusted under 35 U.S.C. 154(b) by 1051 days.

(21) Appl. No.: 11/795,572

(22) PCT Filed: Feb. 22, 2006

(86) PCT No.: PCT/SE2006/000231
§ 371 (c)(1),
(2), (4) Date: Jul. 19, 2007

(87) PCT Pub. No.: WO2006/091148
PCT Pub. Date: Aug. 31, 2006

(65) Prior Publication Data
US 2008/0129711 A1 Jun. 5, 2008

Related U.S. Application Data

(60) Provisional application No. 60/654,948, filed on Feb. 23, 2005.

(30) Foreign Application Priority Data

Feb. 24, 2005 (SE) ...................... 0500419

(51) Int. Cl.
*G06F 0/033* (2006.01)
(52) U.S. Cl. .................. 345/179; 345/182; 345/183
(58) Field of Classification Search ............ 345/179, 345/183, 184
See application file for complete search history.

(56) References Cited

U.S. PATENT DOCUMENTS

| | | | |
|---|---|---|---|
| 5,661,506 | A | 8/1997 | Lazzouni et al. |
| 5,672,852 | A | 9/1997 | Fukuzaki et al. |

(Continued)

FOREIGN PATENT DOCUMENTS

JP A-10-105325 4/1998

(Continued)

OTHER PUBLICATIONS

U.S.P.T.O., Office Action in U.S. Appl. No. 10/306,342 dated Feb. 22, 2005.

(Continued)

*Primary Examiner* — Amare Mengistu
*Assistant Examiner* — Joseph G Rodriguez
(74) *Attorney, Agent, or Firm* — Finnegan, Henderson, Farabow, Garrett & Dunner LLP

(57) ABSTRACT

An electronic pen capable of recording position data representative of its movement runs a time handling method. In this method, a counter is operated to sequentially generate a monotonous sequence of counter values. Further, a time calculator is operated to generate a current time value. Also, a control device is operated to derive a current counter value from the counter and the current time value from the time calculator, and to associate at least a subset of the position data with the current counter value and the current time value. If each subset defines a pen stroke, counter values may represent the order in which pen strokes were created. The pen may allow an external device to arbitrarily adjust the time calculator, e.g. to reflect a local time, since the resulting time values need not be used to determine the mutual order of the pen strokes.

18 Claims, 4 Drawing Sheets

U.S. PATENT DOCUMENTS

| | | | |
|---|---|---|---|
| 5,784,504 A | 7/1998 | Anderson et al. | |
| 5,852,434 A | 12/1998 | Sekendur | |
| 6,262,719 B1 | 7/2001 | Bi et al. | |
| 6,330,976 B1 | 12/2001 | Dymetman et al. | |
| 6,570,104 B1 | 5/2003 | Ericson et al. | |
| 6,587,587 B2 | 7/2003 | Altman et al. | |
| 6,667,695 B2 | 12/2003 | Petterson et al. | |
| 6,674,427 B1 | 1/2004 | Petterson et al. | |
| 6,732,927 B2 | 5/2004 | Olsson et al. | |
| 6,924,790 B1 | 8/2005 | Bi | |
| 7,268,774 B2 * | 9/2007 | Pittel et al. | 345/179 |
| 7,385,595 B2 * | 6/2008 | Bryborn et al. | 345/179 |
| 2002/0000981 A1 | 1/2002 | Hugosson et al. | |
| 2002/0031243 A1 | 3/2002 | Schiller et al. | |
| 2002/0041271 A1 | 4/2002 | LeKuch et al. | |
| 2002/0044138 A1 | 4/2002 | Edso et al. | |
| 2003/0053699 A1 | 3/2003 | Olsson | |
| 2003/0118233 A1 | 6/2003 | Olsson | |
| 2003/0122855 A1 | 7/2003 | Pattersson | |
| 2003/0128194 A1 | 7/2003 | Pettersson | |
| 2003/0189664 A1 | 10/2003 | Olsson | |
| 2004/0075650 A1 | 4/2004 | Paul et al. | |
| 2004/0085287 A1 | 5/2004 | Wang et al. | |
| 2005/0093845 A1 | 5/2005 | Brooks et al. | |
| 2005/0166146 A1 | 7/2005 | Silverbrook et al. | |

FOREIGN PATENT DOCUMENTS

| | | |
|---|---|---|
| JP | 2005-18426 | 1/2005 |
| JP | 11-202064 | 7/2011 |
| WO | WO 00/73887 | 12/2000 |
| WO | WO 00/73983 | 12/2000 |
| WO | WO 01/16691 | 3/2001 |
| WO | WO 01/26032 | 4/2001 |
| WO | WO 01/26033 | 4/2001 |
| WO | WO-01/31570 A2 | 5/2001 |
| WO | WO 01/48591 | 7/2001 |
| WO | WO 01/48685 | 7/2001 |
| WO | WO 01/61455 | 8/2001 |
| WO | WO 01/63393 | 8/2001 |
| WO | WO 01/71471 | 9/2001 |
| WO | WO 01/71473 | 9/2001 |
| WO | WO 01/95091 | 12/2001 |
| WO | WO-02/39377 A1 | 5/2002 |
| WO | WO 02/093467 | 11/2002 |
| WO | WO-03/005181 A1 | 1/2003 |
| WO | WO-03/042907 A1 | 5/2003 |
| WO | WO-03/046708 A1 | 6/2003 |
| WO | WO-2006/004505 A1 | 1/2006 |

OTHER PUBLICATIONS

U.S.P.T.O., Office Action in U.S. Appl. No. 10/306,342 dated Aug. 9, 2005.

U.S.P.T.O., Office Action in U.S. Appl. No. 10/306,342 dated Jan. 20, 2006.

U.S.P.T.O., Office Action in U.S. Appl. No. 10/306,342 dated Aug. 4, 2006.

U.S.P.T.O., Office Action in U.S. Appl. No. 10/306,342 dated Jan. 24. 2007.

Patent Office of the People's Republic of China, Office Action in Chinese Application No. 200680005257.X, dated Nov. 21, 2008.

Extended European Search Report , Application No. EP 06716921, dated Dec. 2, 2009.

Dymetman and Copperman, Intelligent Paper, Xerox Research Center Europe; published in Apr. 1998, XP002328425.

English Translation of Japanese Office Action in Japanese counterpart Application No. 2007-556996, dated Jul. 19, 2011, 3 pages.

* cited by examiner

METHOD IN ELECTRONIC PEN, COMPUTER PROGRAM PRODUCT, AND ELECTRONIC PEN

CROSS-REFERENCE TO RELATED APPLICATIONS

The present application claims the benefit of Swedish patent application No. 0500419-7, filed on Feb. 24, 2005, and U.S. provisional patent application No. 60/654,948, filed on Feb. 23, 2005, both of which being hereby incorporated by reference.

FIELD OF THE INVENTION

The present invention generally relates to electronic pens capable of electronically recording a pen stroke as a sequence of positions, and in particular to time handling within such pens.

BACKGROUND ART

Electronic pens are known and may incorporate a positioning system which actively traces the movement of the pen while it is used for writing on a passive substrate, such as a piece of paper, plastic, carton etc. The positioning system may infer the movement from, for example, a roller ball contacting the substrate, triangulation of signals from one or more external transmitters, integrated acceleration sensors, strain sensors associated with a pen point contacting the substrate, images of a pattern on the substrate, or combinations thereof.

Applicant's WO 02/39377 discloses an electronic pen with an internal time circuit, by means of which each pen stroke can be time-stamped, i.e. associated with a particular time given by the time circuit, typically the time when the pen stroke was recorded by the positioning system or stored in pen memory. The timestamps may then be used, by processing circuitry in the pen or in a receiving unit, in processing of the pen strokes. The timestamps can, i.a., be used to identify any pen strokes that have been recorded since a transmission time point when pen strokes were last transmitted to the receiving unit. The timestamps may also be used to organize the pen strokes with respect to different objects, e.g. different notebooks. If pen strokes are first recorded from a first notebook, and a new notebook is then activated at a certain activation time point, whereupon pen strokes are recorded from this second notebook, the resulting pen strokes can be selectively associated with the first and second notebooks based upon the relation between the timestamps and the activation time point.

Applicant's WO 03/046708 discloses a similar electronic pen, in which each pen stroke is provided with a timestamp given by an internal time circuit. The timestamps are then used, by processing circuitry in the pen or in a receiving unit, to allow functions given by certain pen strokes to operate on pen strokes recorded immediately before or after such certain pen strokes.

Still further, Applicant's WO 03/042907 discloses a method for freeing memory in an electronic pen, in which pen strokes are selectively deleted from pen memory based upon their respective timestamp.

There is thus a desire to have a well-controlled time circuit in each electronic pen.

Applicant's WO 03/005181 discloses a communication protocol used in communication between electronic pens and network servers in an information management system. The pens typically connect to the servers via a network connection unit, such as a mobile phone or a personal computer. According to the communication protocol, a central network server (paper look-up server) is authorized/trusted to submit a time update value to the pen which, upon receipt of the time update value, adjusts its internal time circuit accordingly. Thereby, all pens in the information management system can have their time circuits set in synchronization with a common time reference given by the central network server. Consequently, pen strokes recorded with the pens can be time-stamped with respect to a well-controlled and common time reference.

However, the need for a well-controlled time circuit may run contrary to the demands of the pen user, who may want to be able to adjust the time reference in which the strokes are time-stamped. For example, the pen user may instead want to have the timestamps reflect the exact time of a local device, e.g. the network connection unit which connects the pen to the network. Clearly, this may cause problems if resulting timestamps are used in the processing of the recorded pen strokes.

SUMMARY OF THE INVENTION

The object of the invention is to overcome the above problems of the prior art.

Generally, the object of the invention is at least partly achieved by means of a method, a computer program product and an electronic pen according to the independent claims, preferred embodiments being defined by the dependent claims.

One aspect of the invention is a method in an electronic pen capable of recording position data representative of the movement of the pen. The method comprises operating a counter to sequentially generate a monotonous sequence of counter values; operating a time calculator to generate a current time value; and operating a control device to derive a current counter value from the counter and the current time value from the time calculator, and to associate at least a subset of said position data with the current counter value and the current time value.

In this aspect, the counter value represents the order in which the position data was created. Thus, subsequent processing, in the pen or in an external unit, may use the counter value of each subset to select subsets of position data to be processed. Such subsets may represent pen strokes. Further, the time calculator may be arbitrarily adjusted by an external device in communication with the pen, since the resulting time values need not be used to determine the mutual order of the subsets.

The position data may comprise positions that allow a subsequent recreation of the movement pattern of the pen in a given coordinate system. Alternatively or additionally, the position data may comprise an action identifier which is given by a movement of the pen in a predetermined area on a product, the pen associating the area with a certain action. The position data could also be supplemented by an identifier of the product on which the position data is recorded.

In one embodiment, the counter generates a new counter value whenever a new subset of position data is created. Thus, the counter is implemented as a position or pen stroke counter.

In another embodiment, the counter defines an autonomous time within the pen, each counter value being represented as a system time value. The current system time value and the current time value may indicate the recording of the subset. Thereby, each subset of position data may be time-stamped, as in the prior art, albeit with a system time value instead of a current time value. Thus, existing storage/transport formats for position data may be used.

Moreover, the time calculator may be operated to generate the current time value as a difference value with respect to the current system time value. Thereby, the need for further continuously operating time-defining hardware in the pen is eliminated. Also, the required storage capacity for each subset of position data may be reduced, since the same difference value can be used for several subsets of position data. In fact, the control device may be operated to associate the difference value with all position data stored in a memory of the pen.

In another aspect, the invention is a computer program product that can be loaded into a memory associated with a processor and which comprises instructions for carrying out the above method.

In yet another aspect, the invention is an electronic pen that comprises processing circuitry for carrying out the above method.

Further objectives, features, aspects and advantages of the present invention will appear from the following detailed disclosure, from the attached dependent claims as well as from the drawings.

BRIEF DESCRIPTION OF THE DRAWINGS

Exemplary embodiments of the invention will now be described in more detail with reference to the accompanying schematic drawings.

DETAILED DESCRIPTION OF THE INVENTION

The following description will start out by describing a particular type of code-reading pen which has been developed by the Applicant, and its deployment in different types of information management systems. Then, an embodiment of the inventive time handling will be described with reference to such an electronic pen.

General Deployment

Figure 1:
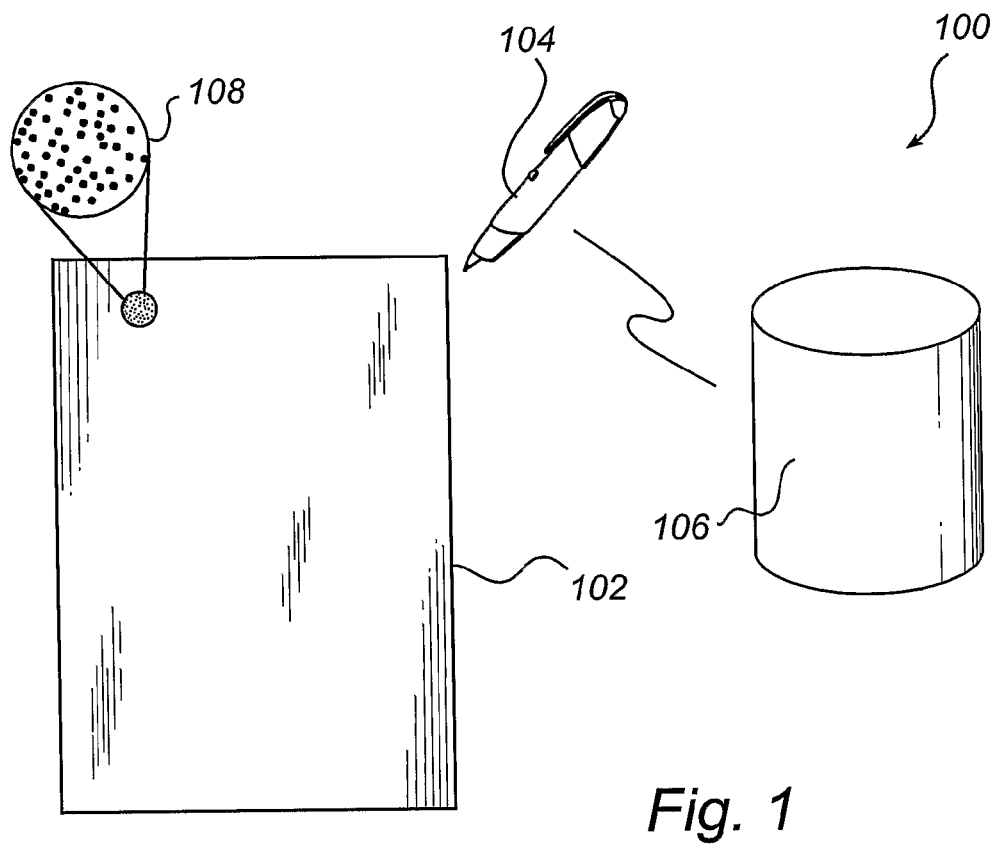
FIG. 1 is a schematic view of a system in which the invention can be used.

FIG. 1 shows a system 100 for information management, in which the present invention can be used. The system comprises a base 102 in the form of a sheet of paper, an electronic pen 104 and a receiving unit 106. The sheet of paper is provided with a position-coding pattern, only a small part 108 of which is schematically indicated in an enlarged scale. The pen 104 can be used to write on the sheet 102 in the same way as with an ordinary pen and to simultaneously record what is being written in electronic form. The electronically recorded information can be processed in the pen 104 and/or the receiving unit 106, to which it can be sent automatically (on-line) or when commanded by the user.

The position-coding pattern encodes absolute positions in a predetermined coordinate system. Such patterns are, i.a., known from U.S. Pat. No. 6,570,104; U.S. Pat. No. 6,667,695; U.S. Pat. No. 6,674,427; U.S. Pat. No. 6,330,976; US 2004/0085287; and U.S. Pat. No. 5,852,434. When a user writes by means of the pen 104 on the sheet 102, the pen will continuously record images of a partial area of the position-coding pattern at the tip of the pen. Each image may be decoded to a position.

Thus, position data may be recorded by the pen 104 during its movement in proximity to the sheet 102, typically when it is used for writing. Generally, the position data represents the writing generated by the pen on the product, as well as the identity of the product. The position data is recorded in the form of pen strokes, each of which being associated with a timestamp. Further, if the pen records position data from different instances of the same product, or identical products, as discussed above with reference to WO 02/39377, the pen may be brought to identify each instance by storing a time-stamped activation flag for each new instance. Still further, the pen may store a layout definition of the product, such that it can identify movement within a certain area ("pidget") on the product. In the case of such movement, the pen may replace, or supplement, the resulting pen stroke by a time-stamped identifier of the area, the identifier being associated with a predetermined action or function.

Electronic Pen

Figure 2:
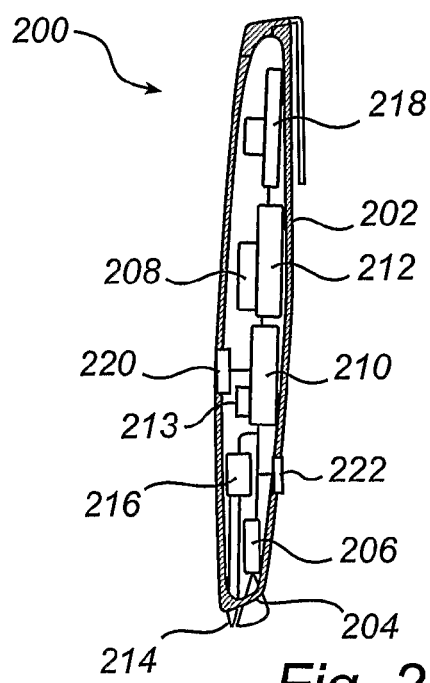
FIG. 2 is a side view, partly in cross-section, of an electronic pen according to an exemplifying embodiment of the invention.

FIG. 2 illustrates an embodiment of such an electronic pen 200, which has a pen-shaped casing or shell 202 that defines a window or opening 204, through which the images are recorded. The casing contains a camera system, an electronics system and a power supply.

The camera system 206 comprises at least one illuminating light source, a lens arrangement and an optical image reader (not shown in the Figure). The light source, suitably a light-emitting diode (LED) or laser diode, illuminates a part of the area that can be viewed through the window 204, by means of infrared radiation. An image of the viewed area is projected on the image reader by means of the lens arrangement. The image reader may be a two-dimensional CCD or CMOS detector which is triggered to capture images at a fixed or variable rate, typically of about 70-100 Hz.

The power supply for the pen is advantageously a battery 208, which alternatively can be replaced by or supplemented by mains power (not shown).

The electronics system comprises a control unit 210 which is connected to a memory block 212. The control unit 210 is responsible for the different functions in the pen and can advantageously be implemented by a commercially available microprocessor such as a CPU ("Central Processing Unit"), by a DSP ("Digital Signal Processor") or by some other programmable logical device, such as an FPGA ("Field Programmable Gate Array") or alternatively an ASIC ("Application-Specific Integrated Circuit"), discrete analog and digital components, or some combination of the above. The memory block 212 preferably comprises different types of memory, such as a working memory (e.g. a RAM) and a program code and persistent storage memory (a non-volatile memory, e.g. flash memory). Associated pen software is stored in the memory block 212 and is executed by the control unit 210 in order to provide a pen control system for the operation of the electronic pen.

The electronic system also comprises a real time oscillator 213 for providing a timing signal for the operation of the control unit 210 and for defining a system time in the pen. A counter in the control unit 210 keeps track of the system time based on the timing signal. The real time oscillator 213 and the counter thus implement a system clock, as will be further described below.

The casing 202 carries a pen point 214 which allows the user to write or draw physically on a surface by a pigment-based marking ink being deposited thereon. The marking ink in the pen point 214 is suitably transparent to the illuminating radiation in order to avoid interference with the opto-electronic detection in the electronic pen. A contact sensor 216 is operatively connected to the pen point 214 to detect when the pen is applied to (pen down) and/or lifted from (pen up), and optionally to allow for determination of the application force. Based on the output of the contact sensor 216, the camera system 206 is controlled to capture images between a pen down and a pen up. The camera system and the control unit implement a positioning system within the pen. Thus, the control unit processes image data to calculate positions encoded by the imaged parts of the coding pattern. Such processing can, e.g. be implemented according to Applicant's prior publications: US 2003/0053699, US 2003/0189664, US 2003/0118233, US 2002/0044138, U.S. Pat. No. 6,667,695, U.S. Pat. No. 6,732,927, US 2003/0122855, US 2003/0128194, and references therein. The resulting sequence of temporally coherent positions forms an electronic representation of a pen stroke.

The electronics system further comprises a communications interface 218 for transmitting or exposing data to a nearby or remote apparatus such as a computer, mobile telephone, PDA, network server, etc. The communications interface 218 may thus provide components for wired or wireless short-range communication (e.g. USB, RS232, radio transmission, infrared transmission, ultrasound transmission, inductive coupling, etc), and/or components for wired or wireless remote communication, typically via a computer, telephone or satellite communications network.

The pen may also include an MMI (Man Machine Interface) 220 which is selectively activated by the pen control system for user feedback. The MMI may include a display, an indicator lamp, a vibrator, a speaker, etc.

Still further, the pen may include one or more buttons 222 by means of which it can be activated and/or controlled.

End-to-End Infrastructure (NBOS)

Figure 3:
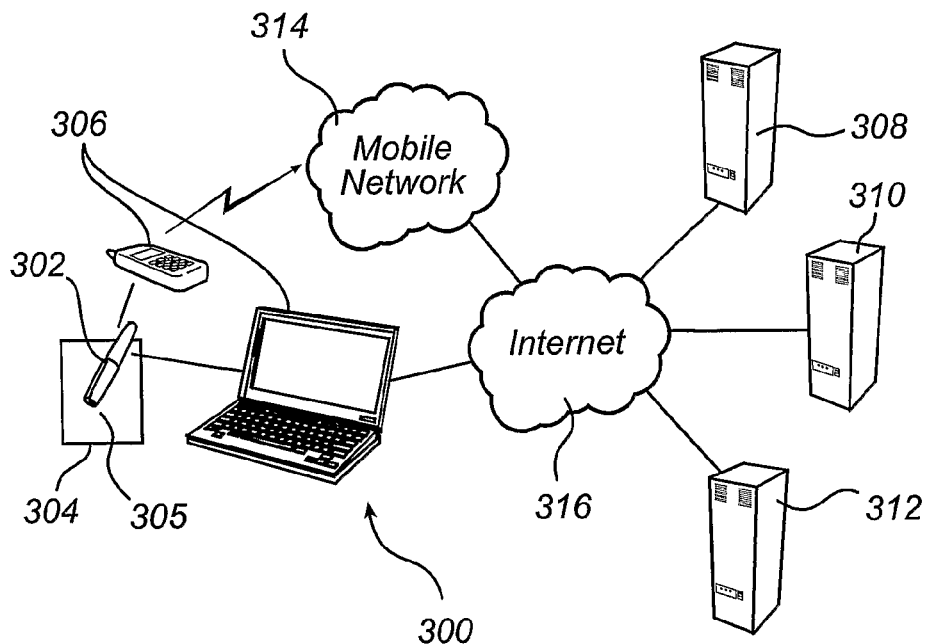
FIG. 3 schematically shows an exemplifying infrastructure with end-to-end communication between pens and services.

FIG. 3 illustrates a system infrastructure 300 developed by the present Applicant. The system comprises electronic pens 302 of the above type, and a plurality of products 304 with a position code (not shown) covering a writing surface 305. In the figure, only one electronic pen and one product are shown. The system further comprises a network connection unit 306, a paper look-up server 308 running a paper look-up service, PLS, an application server 310 running an application service of a third party and an application server 312 running an application service of yet another third party in the system. The application service may include storing or relaying digital information, initiating transmission of information or items to a recipient, etc.

Although the network connection unit 306 is illustrated as a mobile station or a laptop computer, it could alternatively be a personal digital assistant (PDA), a stationary desktop computer, or some other suitable electronic device. Still further, the network connection unit 306 could be integrated as part of the pen's communications interface (cf. 218 in FIG. 2).

Typically, the described system will in addition to a plurality of pens 302 and products 304 include a plurality of network connection units 306 and a plurality of application servers 310, 312.

The system infrastructure 300 is denoted Network-Based Open Service (NBOS) infrastructure, and allows the pen to establish an end-to-end communication with the paper look-up server and the application server, respectively.

The position data recorded by the pen, or part thereof, is communicated by the pen 302 via the mobile station 306, a mobile communications network 314 and the Internet 316 to the paper look-up server 308.

The paper look-up server 308 stores, in internal memory or in a connected database device (not shown), management rules associated with the product. Typically, these management rules cause the paper look-up service to return an instruction set to the pen 302. Based on this instruction set, the pen determines to what recipient address a message is to be transmitted and what data to include in the message. This message is then communicated by the pen via the mobile station 306, the mobile communications network 314 and the Internet 316 to the recipient address, i.e. to a relevant application server 310, 312.

The pen and the services communicate by means of a pen protocol which is a proprietary protocol of the present Applicant and which is based on a predetermined set of instructions that are executable by the control unit of the pen. The pen protocol is implemented on the HTTP protocol, which in turn may be implemented on TCP/IP, PPP and the RFCOMM profile of Bluetooth®. In general, instructions are received by the pen in an HTTP response transmitted from a paper look-up service or an application service in response to an HTTP request previously transmitted by the pen. Such an HTTP request typically consists of four parts: a protocol version data part describing what version of the pen protocol the rest of the request complies to, a request header data part holding meta data about the request, a page data part with recorded pen stroke data, and a property data part with one or more pen property values. The pen property values may be stored in the pen memory to represent a communications setting, a pen user characteristic, a pen characteristic, etc.

As mentioned by way of introduction, the paper look-up service is also capable of adjusting the current time in the pen.

For a more detailed description of the pen protocol and the communication between a pen and a service, reference is made to aforesaid WO 03/005181.

Open-Ended Infrastructure (DAS)

Figure 4:
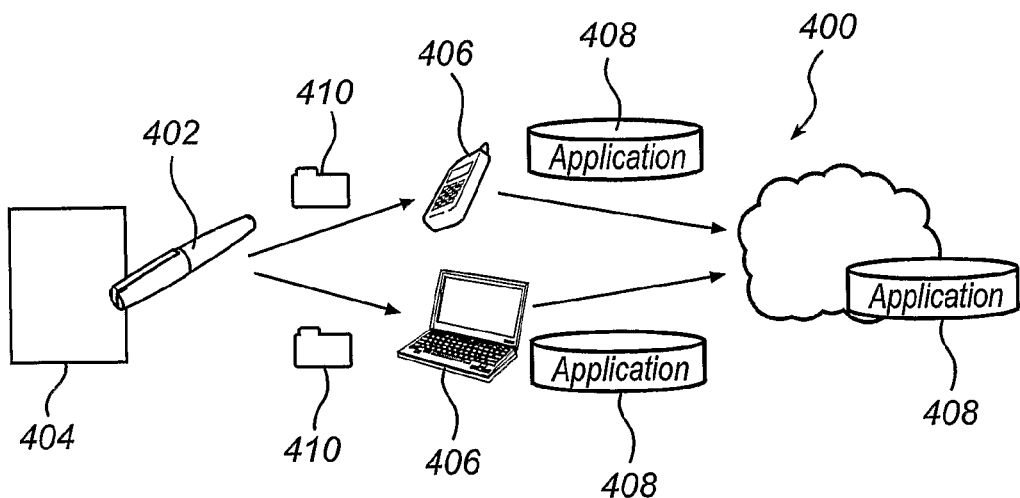
FIG. 4 schematically shows an exemplifying infrastructure with open-ended communication between pens and services.

FIG. 4 illustrates a system infrastructure 400 contemplated by the present Applicant. This system 400, like the system 300 of FIG. 3, comprises electronic pens 402, a plurality of products 404 with a position code (not shown) covering a writing surface. The system further comprises a local receiving unit 406. Although the receiving unit 406 is illustrated as a mobile station or a laptop computer, it could alternatively be a personal digital assistant (PDA), a stationary desktop computer, or some other suitable electronic device. The system also includes a plurality of different application services 408 implemented on the local receiving units 406 and/or on network-connected servers. These application services 408 may include storing or relaying digital information, initiating transmission of information or items to a recipient, etc.

The system infrastructure is denoted Device Application System (DAS) infrastructure, and is configured to handle a file 410 which is exposed by the pen 402. Typically, the pen 402 is configured to generate the file 410 with all relevant information data. Such data includes the position data recorded by the pen 402 on the coded surface of the product 404, as well as data relating to different properties stored in the pen memory. Compared to the NBOS infrastructure 300 of FIG. 3, the DAS infrastructure 400 is open-ended to provide the general advantage that the position data recorded by the pen can be handled asynchronously within the system. There is no end-to-end communication between the pen and the services, since recorded position data is exposed by the pen as an autonomous file 410. Thus, the file 410 can be transported in the system in a sequential chain of transfers, with each transfer being independent of other transfers.

The pen 402 exposes, automatically or on command, the file 410 to the receiving unit 406 which implements an application service 408 for processing the information data in the file and/or for relaying at least part of the information data to an application service 408 on a remote network server.

The pen 402 could for example be designed to push the file 410 with information data to the receiving unit 406 by means of an OBEX push (Object Exchange protocol), which is a standardized protocol known to the skilled person. Alternatively, the pen 402 could allow the device application 408 to pull the file from the pen 402. For example, the file may be stored in a file system in the pen memory, the file system being accessible to the device application via, e.g., USB (Universal Serial Bus), FTP (File Transfer Protocol), HTTP (Hypertext Transfer Protocol), Bluetooth® or any other suitable protocol.

The file 410 exposed by the pen could for example have a format that divides it into four parts. These parts could for example be: a protocol version data part, a request header data part, a page data part and a property data part. A file having such a format has been defined by the Applicant of the present invention and has been allotted the name Pen Generated Coordinates file, or PGC file, making it a proprietary format of the Applicant. The PGC file format, as well as the controlling software and circuitry of the pen for generating and exposing such a file is further described in Applicant's WO 2006/004505, which is herewith incorporated by this reference.

Although the file 410 is output from the pen 402 in one-way communication to the receiving unit 406, the user may be able to download certain setup data to the pen 402, by connecting the pen to a setup station (computer, mobile phone, etc) which allows the user to view and change properties stored in the pen, such as the current time, personal user data, communications settings, etc.

Time Handling

The following discussion presumes that the electronic pen is capable of operating in both the NBOS infrastructure and the DAS infrastructure as described above. Thus, the pen can be switched between an NBOS mode and a DAS mode. For example, the selection of operation mode can be controlled by the position-coded product itself, by the pen control system being configured to associate different products with different modes, via the encoded position data. Alternatively, the pen control system can associate different modes with different external devices, e.g. NBOS mode with a mobile phone, and DAS mode with a laptop computer. For example, the pen control system can enter a particular mode when it detects a connection, or an instruction to connect, to a particular device or a particular type of device. In yet another alternative, the pen control system switches mode when it detects that a dedicated button on the pen has been pressed, that a dedicated audio command has been recorded, or that a dedicated gesture has been identified from a pen stroke.

The time handling as described herein has been developed with a view to at least partly achieve the following objectives:
1. Provide services with information about when position data was recorded by the pen.
2. Allow services in the NBOS infrastructure and users in the DAS infrastructure to freely set the current time in the pen.
3. Enable services to identify strokes that have already been received without having to compare every new stroke with every stroke already received.
4. Enable services to separate strokes into different instances, based on the aforesaid activation flags, even when the strokes are spread out over several requests (NBOS) or PGC files (DAS).
5. Avoid conflicts when both services in the NBOS infrastructure and users in the DAS infrastructure set the current time.
6. Avoid changing the stroke storage format, according to which a timestamp is stored together with each pen stroke.

Figure 5:
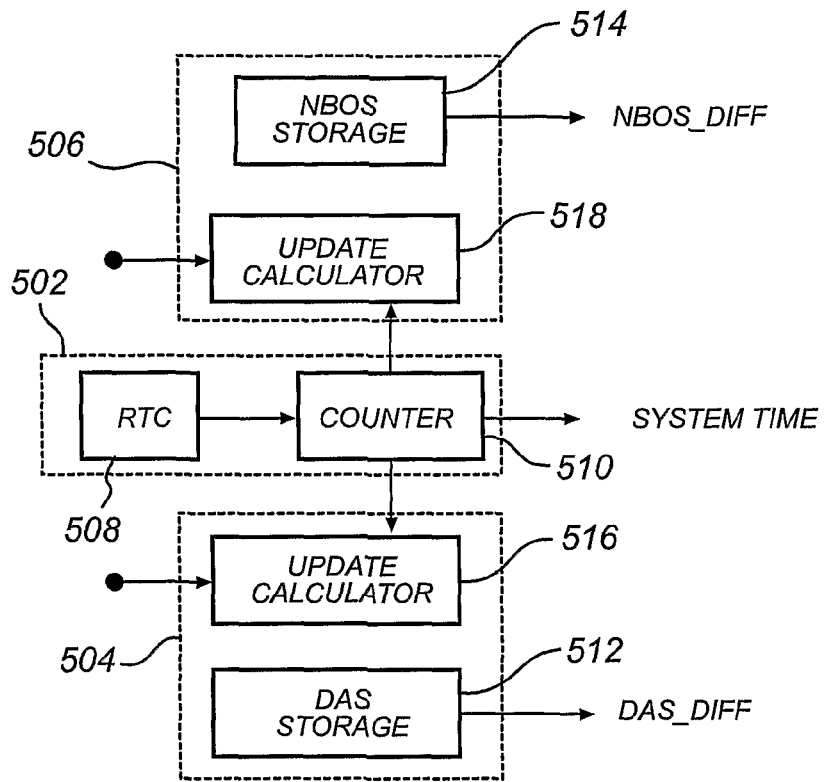
FIG. 5 illustrates time handling components of an electronic pen according to an exemplifying embodiment of the invention.

FIG. 5 illustrates a resulting embodiment of the time handling components in the electronic pen. The pen comprises a system clock 502, a DAS clock 504 and an NBOS clock 506.

The system clock 502, which outputs a system time, is implemented by a real time oscillator 508 (cf. 213 in FIG. 2) in combination with a counter 510. The counter 510 sequentially adds time elements to a starting time based on a pulsed timing signal from the oscillator 508. The system clock 502 is operated at all times, even when the pen control system is deactivated. In one example, the system clock 502 outputs a 64-bit value that represents the number of milliseconds since 1970-01-01. This system time is used for time-stamping each stroke that is created, and is thus incorporated in the stroke storage format. The system clock 502 can not be set by either services or users in the systems. As will be further described below, the pen is also configured to ascertain that the system clock 502 is never moved backwards in time, not even in the event of a total power loss.

By such a system clock, above objective 4 can be achieved.

The DAS clock 504 need not be a separate clock in the pen, but can be realized via a DAS difference value (DAS_DIFF), which may be a 64-bit value retrievable from pen memory by a storage component 512 to indicate the difference between the system time and the user-defined current time in the DAS infrastructure. The DAS clock is relevant to all pen strokes stored in pen memory, to be used for all information data output by the pen in the DAS mode. Specifically, DAS_DIFF is sent together with the strokes in each PGC file. It need only be stored once in each file, e.g. in the property data part, and affects all strokes in the file, as illustrated for strokes S1 and S2 in FIG. 6. Thereby, an application service can calculate a DAS timestamp for each stroke based on the system timestamp that is stored with each stroke and DAS_DIFF, as illustrated to the right in FIG. 6.

By such a DAS clock, above objective 1 can be achieved for the DAS infrastructure.

Since changing DAS_DIFF does not affect the system time and therefore not the ordering of strokes, there does not have to be any constraints on how it can be changed by the user. Consequently, above objective 2 can also be achieved.

Figure 6:
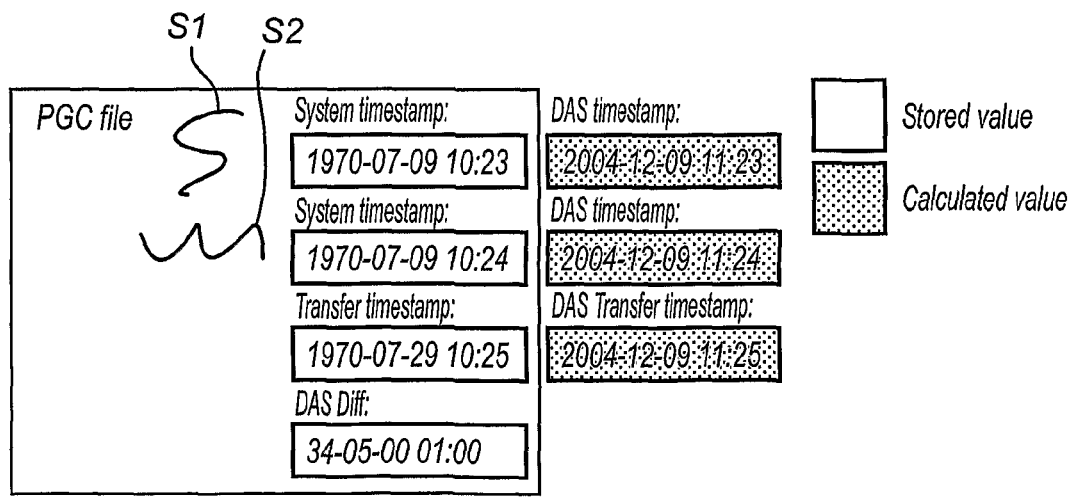
FIG. 6 visualizes pen strokes and associated time handling data in an output file from an electronic pen, as well as time handling data derivable therefrom, according to an exemplary embodiment of the invention.

As also illustrated in FIG. 6, the pen may also be configured to include a transfer timestamp in each PGC file. The transfer timestamp is the current system time when the PGC file is output by the pen. The transfer timestamp may be used by an application service in merging data from two or more PGC files. Such merging may be called for when position data is recorded from a product at different occasions, and is exposed to an application service on each such occasion. It may happen that DAS_DIFF differs between such PGC files. The transfer timestamp allows the application service to select one DAS_DIFF to be associated with the merged data. In one embodiment, DAS_DIFF is selected from the latest PGC file, i.e. the file including the latest transfer timestamp.

The NBOS clock 506 of FIG. 5 need not be a separate clock in the pen, but can be realized via an NBOS difference value (NBOS_DIFF), which may be a 64-bit value retrievable from pen memory by a storage component 514 to indicate the difference between the system time and the current time on the paper look-up server. The NBOS clock is relevant to all pen strokes stored in pen memory, to be used for all information data output by the pen in the NBOS mode. Specifically, NBOS_DIFF is sent together with the strokes in the requests output by the pen in the NBOS mode. It need only occur once in each request, e.g. in the property data part, and affects all strokes in the request. In this way the services can calculate an NBOS timestamp for each stroke, based on the system timestamp that is stored with each stroke and NBOS_DIFF.

By such an NBOS clock, above objective 1 can be achieved for the NBOS infrastructure.

By using independent difference values for the DAS and NBOS modes, above objective 5 can be achieved.

Since DAS_DIFF and NBOS_DIFF only need to be included as a global value in each PGC file and pen request, respectively, there is no need to change the stroke storage format. Thus, above objective 6 can be achieved.

Figure 7:
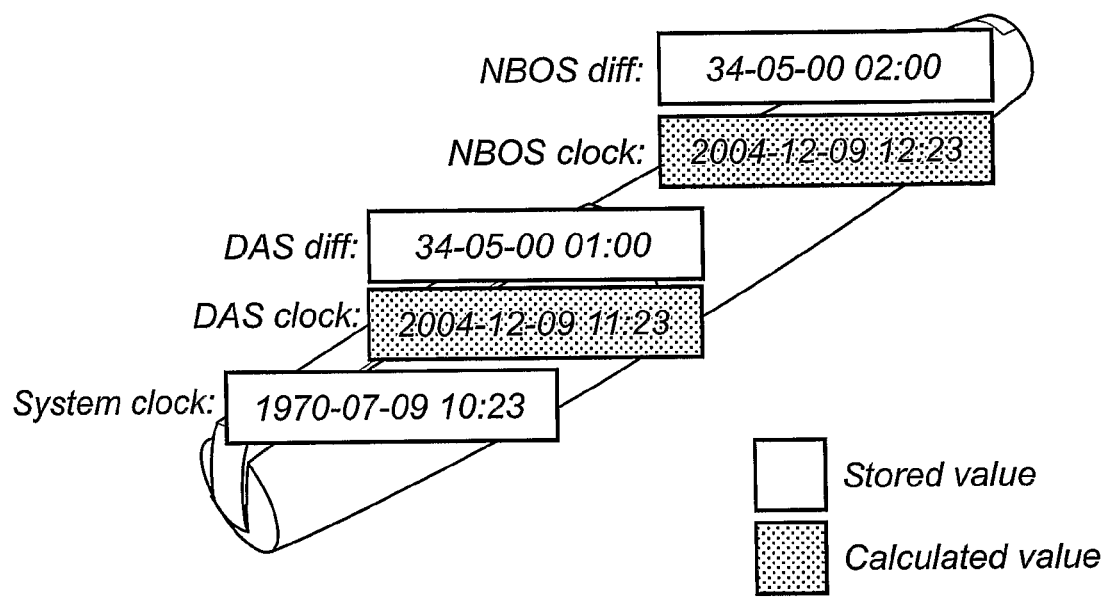
FIG. 7 visualizes different clocks in an electronic pen, as well as data derivable from such clocks, according to an exemplary embodiment of the invention.

FIG. 7 summarizes the time handling data stored in the pen, and the time handling data that can be calculated, either by the pen itself or by an application service, based upon the stored time handling data.

As mentioned above, the user can update the current time in the pen by connecting the pen to a setup station. As shown in FIG. 5, the DAS clock 504 may include an update calculator 516 which, upon receipt of an update value from the setup station, derives the current system time from the system clock 502, calculates the difference between the update value and the current system time, and stores this difference as DAS_DIFF in pen memory.

Similarly, the paper look-up server can update the current time in the pen. The NBOS clock 506 may include an update calculator 518 which, upon receipt of an update value from the paper look-up server, derives the current system time from the system clock 502, calculates the difference between the update value and the current system time, and stores this difference as NBOS_DIFF in pen memory.

It should be realized that the counter 510, the storage components 512, 514 and the update calculators 516, 518 may be embodied by hardware components, or software components executed by the pen's control unit, or a combination thereof.

In an alternative embodiment, the setup station or paper look-up server may derive the current system time from the pen, make the calculation and return the difference to the pen for storage as DAS_DIFF and NBOS_DIFF, respectively.

In the case of a complete power loss, the system clock 502 may be reset to the starting time. Therefore, the pen is configured to store a current value of the system time each time it outputs strokes to another device, i.e. a transfer timestamp. At each start-up of the pen control system, the pen retrieves this transfer timestamp and also identifies the latest timestamp among the strokes stored in pen memory. It then compares the system clock to the transfer timestamp and to the latest stroke timestamp. If the system clock's current value is lower than either of these timestamps, the system clock is set to the latest of these timestamps. This method guarantees that all strokes that ever leave the pen will have incrementing system timestamps. A variant of this method would be to store the current value of the system clock when the pen control system shuts down.

The application services and the update station may all comprise an API (Application Program Interface) which can return a timestamp value for each stroke. For prior art pens, in which the system clock defines the current time and is settable only by the paper look-up service, the NBOS API simply derives the timestamp as the actual system timestamp of each stroke. For the pens with time handling as described above, the NBOS API calculates, upon receipt of a request with information data from a pen, a current timestamp for each stroke based upon the system timestamp of each stroke and NBOS_DIFF. Similarly, the DAS API calculates, upon receipt of a PGC file with information data, a current timestamp for each stroke based upon the system timestamp of each stroke and DAS_DIFF. The system timestamp is also accessible through all APIs. This value is useful for services that rely on the order in which strokes were created, e.g. when determining if the same strokes are received several times.

There are many variations that may be made consistent with the present invention. The foregoing description is presented for purposes of illustration and description. It is not exhaustive and does not limit the invention to the precise form disclosed. Modifications and variations are possible in light of the above teachings or may be acquired from practicing the invention.

In one variant of the NBOS mode, the pen control system is configured to change the timestamps of strokes before including these strokes in a request to a service. Specifically, the pen calculates a current timestamp for each such stroke based upon the system timestamp of the stroke and NBOS_DIFF. The system timestamp of these strokes are then changed to the current timestamp. By this operation, the pen requests can have the same format as for prior art pens, thereby eliminating the need to update the NBOS API of the application services to process data from pens with the time handling described herein. This variant may also be implemented for the DAS mode.

In one variant of the DAS mode, the pen control system does neither store, nor output DAS_DIFF. Instead, the PGC file is generated to include the strokes, each time-stamped with a respective current system time, and the above-mentioned transfer timestamp. In this variant, there is no need to set a current time in the pen via an update station. Instead, the application service can be configured to derive, upon receipt of a PGC file, its own current time, typically from a clock on the device hosting the application service, calculate the difference between this current time and the transfer timestamp, and use the resulting difference value like DAS_DIFF is used in the DAS API described above. Thus, the application service can calculate a current timestamp for each stroke based upon the system timestamp of each stroke and the difference value, or it can include the difference value in the PGC file for use by another application service. This variant may also be implemented for the NBOS mode.

It is also conceivable that the pen stores and/or outputs different NBOS_DIFF/DAS_DIFF values for different strokes or sets of strokes in the pen memory, to reflect the current time (DAS time and/or NBOS time) when each stroke or set of strokes was created or stored in pen memory. In one such embodiment, each NBOS_DIFF/DAS_DIFF value (below collectively denoted DIFF value) is applicable to all subsequently created strokes, until a new DIFF value is stored in the pen. There are several ways to implement such functionality.

In one implementation, strokes or sets of strokes are stored in sequence in pen memory based on their system timestamps, wherein the DIFF values are also placed in this sequence based on when they were created in the system time frame. For example, strokes may be stored sequentially in one or more files in pen memory, e.g. with separate files being created for strokes emanating from separate parts of the position-coding pattern. Upon creation of a new DIFF value, this value may be automatically appended to all files in pen memory. Alternatively, the latest DIFF value is kept in pen memory, and is then appended to a specific file whenever a new stroke is to be written to this file, so that the DIFF value is selectively added to those files for which it has any relevance. When strokes are output, they may likewise be arranged in sequence with any relevant DIFF values, so that a receiving application service is capable of assigning a current timestamp to each stroke based on the order of strokes and DIFF values.

In another implementation, each DIFF value is stored with a system timestamp. Here, strokes may be output in any order together with a relevant set of such time-stamped DIFF values, or DIFF value(s) may be output, with or without system timestamp, as incorporated in a sequence of strokes, similarly to the first implementation above.

As an alternative, the pen may timestamp each stroke with both a system time value and a DAS time value/NBOS time value, before the stroke is stored in pen memory or output from the pen.

In another variant, the system clock in the pen is replaced by a monotonously incrementing stroke/position counter which generates a stroke/position number for each stroke/position that is created in the pen. Like the system clock, the stroke/position counter can not be set by either services or users in the systems. In such a variant, the DAS and NBOS clocks may be implemented as separate real time clocks that generate the current DAS and NBOS times in the pen. These clocks can be set by users and services in the respective infrastructure. Thus, the each individual stroke can be associated with a stroke number and a current timestamp.

In still another variant, instead of operating the system clock at all times, the system clock 502 may be operated only when the pen control system is activated, the current value of the system clock being stored in pen memory whenever the pen control system shuts down. Thus, upon activation, the pen control system retrieves this value for use as the starting time of the counter.

It should also be realized that the system clock/stroke counter could instead generate monotonously decreasing values of the system time/stroke number.

Further, the inventive time handling may be deployed in a pen capable of operating in only one communication mode, e.g. one of the above-described DAS and NBOS modes.

Still further, the above-described positioning system may be supplemented or replaced by another type of positioning system, for example selected among the prior art positioning systems as described by way of introduction.

The invention claimed is:

1. A method in an electronic pen capable of recording position data representative of the movement of the pen, said method comprising:
    operating a counter to sequentially generate a monotonous sequence of counter values, wherein the counter defines an autonomous system time within the pen, each current counter value being represented as a current system time value;
    operating a time calculator to generate a current time value;
    operating the time calculator to generate the current time value as a difference value with respect to the current system time value;
    operating a control device to derive a current counter value from the counter and the current time value from the time calculator, and to associate at least a subset of said position data with the current counter value and the current time value;
    operating the control device to output the subset of position data combined with the current system time value, and the difference value combined with the current system time value.

2. The method of claim 1, further comprising: operating the control device to associate the difference value with all position data stored in a memory of the pen.

3. The method of claim 1, further comprising:
    adjusting the time calculator upon receipt of a user-defined time reference value.

4. The method claim 1, further comprising:
    upon receipt of a time reference value, operating the time calculator to update the difference value by calculating a difference between the time reference value and the current system time value.

5. The method of claim 1, wherein the counter is operated as an autonomous realtime clock (RTC).

6. A computer program product that can be loaded into a memory associated with a processor and which comprises instructions for carrying out the method of claim 1.

7. An electronic pen, comprising processing circuitry for carrying out the method of claim 1.

8. The electronic pen of claim 7, further comprising: a positioning system for recording the position data.

9. The electronic pen of claim 8, wherein the positioning system is configured to calculate the position data to represent movement of the pen in proximity to a base.

10. The electronic pen of claim 9, wherein the positioning system is configured to infer the movement from at least one of: a roller ball contacting the base, triangulation of signals from one or more external transmitters, integrated acceleration sensors, strain sensors associated with a pen point contacting the base, and images of the base generated by an integrated optical reader.

11. A method in an electronic pen capable of recording position data representative of the movement of the pen, said method comprising:
    operating a counter to sequentially generate a monotonous sequence of counter values, wherein the counter defines an autonomous system time within the pen, each current counter value being represented as a current system time value;
    operating a time calculator to generate a current time value;
    operating the time calculator to generate the current time value as a difference value with respect to the current system time value;
    operating a control device to derive a current counter value from the counter and the current time value from the time calculator, and to associate at least a subset of said position data with the current counter value and the current time value;
    operating the control device to associate the difference value with the current system time value; and
    operating the control device to arrange the difference value and a plurality of subsets of position data in a sequence given by their associated current system time values.

12. The method of claim 11, further comprising: operating the control device to output at least part of said sequence.

13. A method in an electronic pen capable of recording position data representative of the movement of the pen, said method comprising:
    operating a counter to sequentially generate a monotonous sequence of counter values, wherein the counter defines an autonomous system time within the pen, each current counter value being represented as a current system time value;

operating a time calculator to generate a current time value;

operating the time calculator for generating the current time value in a first operation mode of the control device, and operating a further time calculator for generating a second current time value in a second operation mode of the control device;

operating a control device to derive a current counter value from the counter and the current time value from the time calculator, and to associate at least a subset of said position data with the current counter value and the current time value;

operating the control device, in the second operation mode, to execute a one-way exposure of a file object to an external device, said file object including data representative of said subset; and operating the control device, in the second operation mode, to incorporate in the file object a transfer time value which is indicative of the current system time value at said exposure of the file object.

14. A method in an electronic pen capable of recording position data representative of the movement of the pen, said method comprising:

operating a counter to sequentially generate a monotonous sequence of counter values, wherein the monotonous sequence is incrementing;

operating a time calculator to generate a current time value;

operating a control device to derive a current counter value from the counter and the current time value from the time calculator, and to associate at least a subset of said position data with the current counter value and the current time value; and operating the control device to intermittently store the counter value as a backup value in non-volatile memory; and operating the control device, at startup, to derive the backup value and set the counter value to the higher of the stored value and the counter value.

15. An electronic pen, comprising processing circuitry for carrying out the method of claim 14.

16. The electronic pen of claim 15, further comprising: a positioning system for recording the position data.

17. The electronic pen of claim 16, wherein the positioning system is configured to calculate the position data to represent movement of the pen in proximity to a base.

18. The electronic pen of claim 17, wherein the positioning system is configured to infer the movement from at least one of: a roller ball contacting the base, triangulation of signals from one or more external transmitters, integrated acceleration sensors, strain sensors associated with a pen point contacting the base, and images of the base generated by an integrated optical reader.

* * * * *